United States Patent [19]
Bakhitov et al.

[11] 3,919,195
[45] Nov. 11, 1975

[54] PROCESS FOR PRODUCING 2,4-TOLUYLENEDIISOCYANATE DIMER

[76] Inventors: Mansur Idiatullovich Bakhitov, ulitsa Komarova, 4, kv. 86.; Evgeny Vasilievich Kuznetsov, ulitsa Aivazovskogo, 19, kv. 13., both of Kazan; Nina Nikolaevna Zolotarevskaya, prospekt Tsiolkovskogo, 17-a, kv. 16., Dzerzhinsk, Gorkovskoi oblasti; Nataliya Alexandrovna Popova, prospekt Tsiolkovskogo, 31, kv. 17., Dzerzhinsk,Gorkovskoi oblasti; Veniamin Grigorievich Golov, prospekt Pobedy, 3, kv. 11., Dzerzhinsk, Gorkovskoi oblasti; Jury Alexandrovich Rodionov, ulitsa Griboedva, 33, kv. 18., Dzerzhinsk, Gorkovskoi oblasti; Igor Ivanovich Molev, ulitsa Griboedva, 36, kv. 22., Dzerzhinsk, Gorkovskoi oblasti; Vladimir Mortkovich Kotlyarsky, prospekt Pobedy, 3, kv. 34., Dzerzhinsk, Gorkovskoi oblasti, all of U.S.S.R.

[22] Filed: Oct. 3, 1973

[21] Appl. No.: 403,213

[52] U.S. Cl. ............................................. 260/239 A
[51] Int. Cl.$^2$ ....................................... C07D 229/00
[58] Field of Search ............................... 260/239 A

[56] References Cited
UNITED STATES PATENTS
2,683,144   7/1954   Balon ............................... 260/239 A OTHER PUBLICATIONS
Arnold et al., Chem. Reviews, Vol. 57, pp. 54–57, (1957).
Weissberger, Heterocyclic Compounds, Vol. 19, Part 2, (New York, 1964), pp. 967–968.
Kuznetsov et al. I, Chem. Abstracts, Vol. 64, Col. 643, (1966).
Kuznetsov et al. II, Chem. Abstracts, Vol. 68, Abstract No. 87822v, (1968).

*Primary Examiner*—Alton D. Rollins
*Attorney, Agent, or Firm*—Waters, Schwartz & Nissen

[57] ABSTRACT

A process for producing 2,4-toluylenediisocyanate dimer involves dimerization of 2,4-toluylenediisocyanate at a temperature of from 15° to 60°C in the presence of a trialkylphosphite as a catalyst, the latter being employed in an amount of 2 to 5% by weight of the 2,4-toluylenediisocyanate.

7 Claims, 1 Drawing Figure

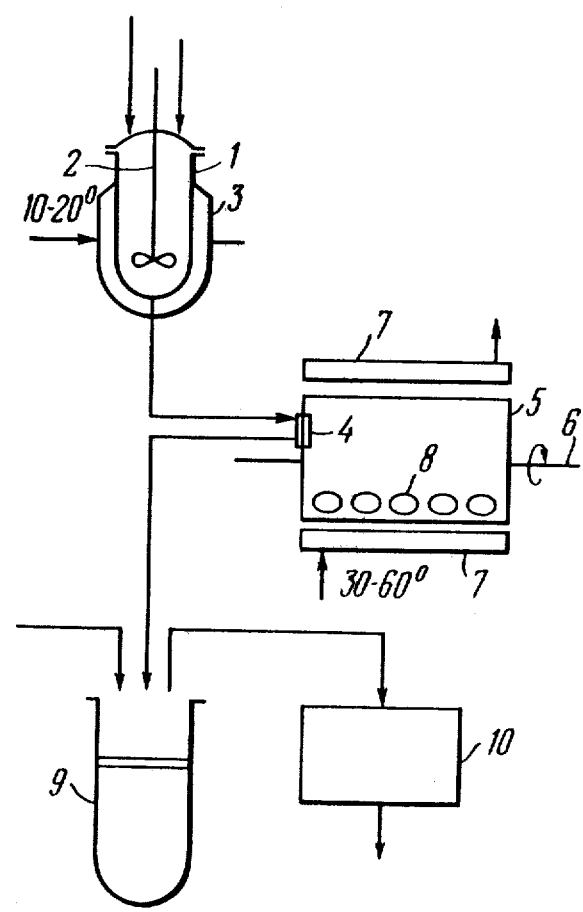

PROCESS FOR PRODUCING 2,4-TOLUYLENEDIISOCYANATE DIMER

The present invention relates to processes for producing 2,4-toluylenediisocyanate dimer.

Said dimer is employed for vulcanization of polyurethane rubbers and for bonding polyester cord to a vulcanizate.

Known in the art are processes for producing 2,4-toluylenediisocyanate dimer, using as dimerization catalysts pyridine and its substituted derivatives.

These prior-art processes contemplate the dimer production in an organic solvent medium or in excess of pyridine.

Said processes have a disadvantage residing in the formation, along with the dimer, of polymeric products; some of these products precipitate with the dimer, while others remain in the solution. The formation of such polymeric products lowers the yield of 2,4-toluylenediisocyanate dimer thus increasing production wastes and resulting in the necessity of dimer purification, for example by mean of recrystallization from a suitable solvent.

The disadvantages inherent in the prior-art processes consist also in the use of highly inflammable solvents and toxic catalysts.

Also known in the art is a process for producing 2,4-toluylenediisocyanate dimer using, as a catalyst, N-methyl (or ethyl) morpholine. This prior-art process also features the same disadvantages as those inherent in the process of production contemplating the use of pyridine.

Other prior-art processes for producing 2,4-toluylenediisocyanate dimer are based on the use of phosphorous compounds as catalysts, for instance a process for producing the dimer in an aqueous medium. However, in this case there is obtained a dimer contaminated with the reaction products of 2,4-toluylenediisocyanate with water, these products being insoluble in organic solvents. To purify the dimer from said contaminants, it is necessary to recrystallize the product from organic solvents.

The dimer of 2,4-toluylenediisocyanate may be produced by still other processes, wherein use is made of organic phosphorous compounds as catalysts, such as alkyl- or alkylarylphosphines or compounds corresponding to the formula:

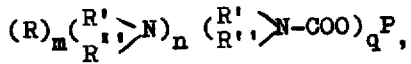

wherein R is an organic radical attached to phosphorus; R' and R'' are, each, an alkyl or cycloalkyl; $m=0-2$; $n=0-3$; $q=3-m-n$.

The process for the dimer production is effected in an organic solvent medium at temperatures ranging from 10° to 20°C. The resulting dimer precipitates. The precipitate is separated from the solution, the solvent is regenerated and recycled back to the process.

This prior-art process also has a disadvantage residing in the use of highly inflammable solvents, toxic catalysts; complicated process technology of the dimer production caused by the necessity to regenerate the solvent; complicated technology of the catalyst preparation due to the use of metallic sodium.

It is an object of the present invention to provide a process for producing 2,4-toluylenediisocyanate dimer which would make it possible to produce the desired product of a high quality and with a good yield.

It is another object of the present invention to simplify the process technology by eliminating the use of highly inflammable solvents.

Still another object of the present invention is to provide a process enabling the use of but slightly toxic catalysts.

These and other objects are accomplished by effecting the dimerization of 2,4-toluylenediisocyanate, according to the present invention, in the presence of alkyl derivatives of trivalent phosphorus as a catalyst. In accordance with the present invention, the process is effected at a temperature within the range of from 15° to 60°C in the presence of trialkylphosphites in an amount of from 2 to 5% by weight of 2,4-toluylenediisocyanate.

In the reaction of 2,4-toluylenediisocyanate with a trialkylphosphite a complex is formed consisting of 3 molecules of 2,4-toluylenediisocyanate and 1 molecule of the trialkylphosphite which reacts with 2,4-toluylenediisocyanate with the formation of 2,4-toluylenediisocyanate dimer. The reaction of 2,4-toluylenediisocyanate with a trialkylphosphite proceeds rather rapidly even in the cold. The speed of the reaction of the resulting complex with 2,4-toluylenediisocyanate depends on temperature, nature of the selected trialkylphosphite and its concentration in the starting mixture. The speed of the dimer formation increases with the temperature increase; however, the speed of the formation of by-products is also increased. Therefore, for each particular trialkylphosphite a minimal temperature is selected within the range of from 15° to 60°C. Below 15°C the speed of dimerization of 2,4-toluylenediisocyanate becomes too low. Above 60°C the reaction of trimerization of 2,4-toluylenediisocyanate proceeds at a high speed.

The dimerization of 2,4-toluylenediisocyanate may be effected both in a melt of 2,4-toluylenediisocyanate and in an inert solvent such as chlorobenzene, toluene, cyclohexane, and the like. During the complex formation, 10 kcal of heat per mole of a trialkylphosphite is evolved in a short time. When this heat is not removed fast enough, the reaction mixture is overheated, which results in the formation of greater amounts of by-products. For this reason, the dimerization of 2,4-toluylenediisocyanate in the presence of a trialkylphosphite should be conducted under conditions of intensive heat removal, namely: first at temperatures not exceeding 20°C and then at temperatures above 20°C but not exceeding 60°C.

During the dimerization of 2,4-toluylenediisocyanate in the presence of trialkylphosphites the trimerization of 2,4-toluylenediisocyanate proceeds simultaneously. Therefore, the dimer of 2,4-toluylenediisocyanate obtained in a melt of 2,4-toluylenediisocyanate contains 2,4-toluylenediisocyanate trimer as an impurity. When the dimerization reaction is conducted in a solution, the dimer precipitates while the trimer remains in the solution. After separation of the dimer from the solution by filtration, it is wetted by the solution containing 2,4-toluylenediisocyanate trimer.

To purify the dimer of 2,4-toluylenediisocyanate, it is washed, in both cases, with a solvent in which the trimer is readily soluble, while the dimer is insoluble; as such solvent use may be made of acetone, methyl ethyl ketone or an alkyl acetate. When the dimer is produced in a solution, it is washed with the same solvent as that in which the reaction has been conducted.

Under the above-described conditions, the dimerization of 2,4-toluylenediisocyanate results in a high-quality product produced with a high yield by a simple technology using a slightly toxic catalyst.

The process for producing 2,4-toluylenediisocyanate dimer is preferably effected in the following manner.

Using an apparatus as shown in the drawing, 2,4-toluylenediisocyanate is mixed with a trialkylphosphite in a mixer 1 provided with a stirrer 2 and a jacket 3, through which water is passed at a temperature not exceeding 20°C. Mixing is performed at a speed precluding the mixture temperature from raising above 20°C.

The resulting mixture is charged through a port 4 into a dimerization reactor 5 which comprises a hollow drum rotating about its axis 6. The drum is surrounded with a stationary jacket 7, through which hot water is passed to maintain the required reaction temperature by heat radiation. Placed into the drum are freely falling metallic or ceramic balls 8 or bars for intermixing and grinding the product.

As the dimerization reactor, use may be made of any other apparatus, such as a vibro-reactor, ensuring maintanance of the reaction temperature within the range of from 30° to 60°C, continuous agitation of the reaction mixture and grinding of the resulting product, or any similar apparatus.

The dimerization reaction proceeds for a period of from 2 to 100 hours, depending on the selected trialkylphosphite and its concentration in the reaction mixture.

The resulting product is discharged from the reactor through the port 4. The product comprises 2,4-toluylenediisocyanate dimer contaminated with 3 to 16% of 2,4-toluylenediisocyanate trimer, and 0.5 to 2.0% of polymeric products. The dimer melting temperature is 142°-148°C.

To purify the resulting dimer from trimer impurities it is washed with acetone or other solvent dissolving the trimer and not dissolving the dimer on a filter 9. The washed dimer is dried in a dryer 10 to give 2,4-toluylenediiisocyanate melting at 155°-156°C.

For a better understanding of the present invention the following examples illustrating the production of 2,4-toluylenediisocyanate are given hereinbelow.

EXAMPLE 1

17.4 g. of 2,4-toluylenediisocyanate are mixed in a flask with 0.87 g. of triisopropylphosphite at 30°C and the resulting mixture is kept at this temperature for 48 hours in the same flask. The thus-obtained solid block of the product is crushed and ground into a powder. The resulting powder-like product contains 95% of 2,4-toluylenediisocyanate dimer, 4% of acetone-soluble impurities (2,4-toluylenediisocyanate trimer and the catalyst transformation products), and 1.0% of polymeric products insoluble in hot chlorobenzene. The desired product melts at 145°C. The product is identified, by IR-spectrum, as dimer.

The final product is washed with 3 portions of dry acetone, 5 g. each, and dried at 60°C to give pure dimer containing no acetone-soluble impurities. The dimer melts at 156°C. The yield of the dimer is 94.5%.

EXAMPLE 2

17.4 g of 2,4-toluylenediisocyanate are mixed at 20°C with 0.4 g. of triisopropylphosphite and the resulting mixture is kept at 30°C for a period of 60 hours. The thus-obtained solid block of the product is crushed and ground into a powder. The product contains 96% of 2,4-toluylenediisocyanate dimer, 3.5% of acetone-soluble impurities, and 0.5% of polymeric products insoluble in hot chlorobenzene. The product melts at 148°C.

EXAMPLE 3

25 g. of 2,4-toluylenediisocyanate are mixed at 20°C with 0.75 g. of triisopropylphosphite and the resulting mixture is kept at 50°C for 20 hours to give a solid block of the product which is then crushed and ground into a powder. The powder contains 90% of 2,4-toluylenediisocyanate dimer, 8% of acetone-soluble impurities, and 2% of polymeric products insoluble in hot chlorobenzene. The product melts at 142°C.

EXAMPLE 4

12.2 g. of 2,4-toluylenediisocyanate are mixed at 20°C with 0.5 g. of triisopropylphosphite and the resulting mixture is kept at 60°C for 12 hours to give a product containing 90% of 2,4-toluylenediisocyanate dimer.

EXAMPLE 5

12.2 g. of 2,4-toluylenediisocyanate are mixed at 20°C with 1.0 g. of tributylphosphite and the resulting mixture is kept at 60°C for a period of 80 hours to give a product containing 90% of 2,4-toluylenediisocyanate dimer. The product is washed with methyl ethyl ketone and dried to give 2,4-toluylenediisocyanate dimer melting at 155°C. The dimer yield is 89.5%.

EXAMPLE 6

12.2 g. of 2,4-toluylenediisocyanate are mixed at 20°C with 1.0 g. of triamylphosphite and the resulting mixture is kept at 60°C for 100 hours to give a product containing 85% of 2,4-toluylenediisocyanate dimer. The product is washed with ethyl acetate and dried to give 2,4-toluylenediisocyanate dimer melting at 157°C. The dimer yield is 84%.

EXAMPLE 7

180 g. of 2,4-toluylenediisocyanate are mixed with 60 g. of chlorobenzene and 7.5 g. of triisopropylphosphite at 50°C and kept at this temperature for 20 hours. Thereafter, the resulting dimer precipitate is separated from the reaction products by filtration, washed with cold chlorobenzene, and dried under vacuum at 60°-70°C to give 126 g. of 2,4-toluylenediisocyanate dimer melting at 156°C. The dimer yield is 70%.

EXAMPLE 8

180 g. of 2,4-toluylenediisocyanate are mixed with 60 g. of benzene and 7.5 g. of triisopropylphosphite at 15°C. The resulting mixture is kept at 50°C for 20 hours. Thereafter, the resulting dimer precipitate is separated from the reaction products by filtration, washed with cold benzene, and dried at 60°-70°C to give 130 g. of 2,4-toluylenediisocyanate dimer melting at 142°C. The dimer yield is 72.5%.

EXAMPLE 9

Into a mixer provided with an agitator and a jacket through which water is passed at 15°C, 20 kg. of 2,4-toluylenediisocyanate are charged and its temperature is brought to 15°-16°C. Then 0.6 kg. of triisopropylphosphite are gradually added thereto under controlled temperature conditions in the reactor by discontinuing the triisopropylphosphite supply when the reaction temperture exceeds 20°C.

The resulting mixture is charged into a stainless steel drum provided with a jacket to maintain constant temperature inside the drum. Also charged into the drum are metal balls or bars. The drum is driven into rotation at a speed of 20 to 60 r.p.m. which is continued for 40 hours at 35°–40°C to give a product melting at a temperature of at least 148°C. The dimer contains 7% of impurities soluble in acetone and 1% of impurities insoluble in hot chlorobenzene. To obtain the pure product, the dimer is washed with cold acetone or methyl ethyl ketone to give the dimer melting at 157°C.

What is claimed is:

1. A process for producing 2,4-toluylenediisocyanate dimer comprising dimerization of 2,4-toluylenediisocyanate at a temperature within the range of from 15 to 60°C in the presence of a trialkyl-phosphite as a catalyst in an amount of 2 to 5% by weight of 2,4-toluylenediisocyanate.

2. A process as claimed in claim 1, wherein the dimerization reaction is conducted in the presence of an organic solvent.

3. A process as claimed in claim 1, wherein the dimerization of 2,4-toluylenediisocyanate is first conducted at a temperature not exceeding 20°C and then at a temperature above 20°C but not exceeding 60°C.

4. A process as claimed in claim 2, wherein the dimerization of 2,4-toluylenediisocyanate is first conducted at a temperature not exceeding 20°C and then at a temperature above 20°C but not exceeding 60°C.

5. A process as claimed in claim 1, wherein the reaction product is washed with an organic solvent.

6. A process as claimed in claim 2, wherein the reaction product is washed with an organic solvent.

7. A process as claimed in claim 3, wherein the reaction product is washed with an organic solvent.

* * * * *